234X
234X
B. Dearborn's.
Vibrating Steelyards
Patented 14th Feby 1799
234X
2-14-1799
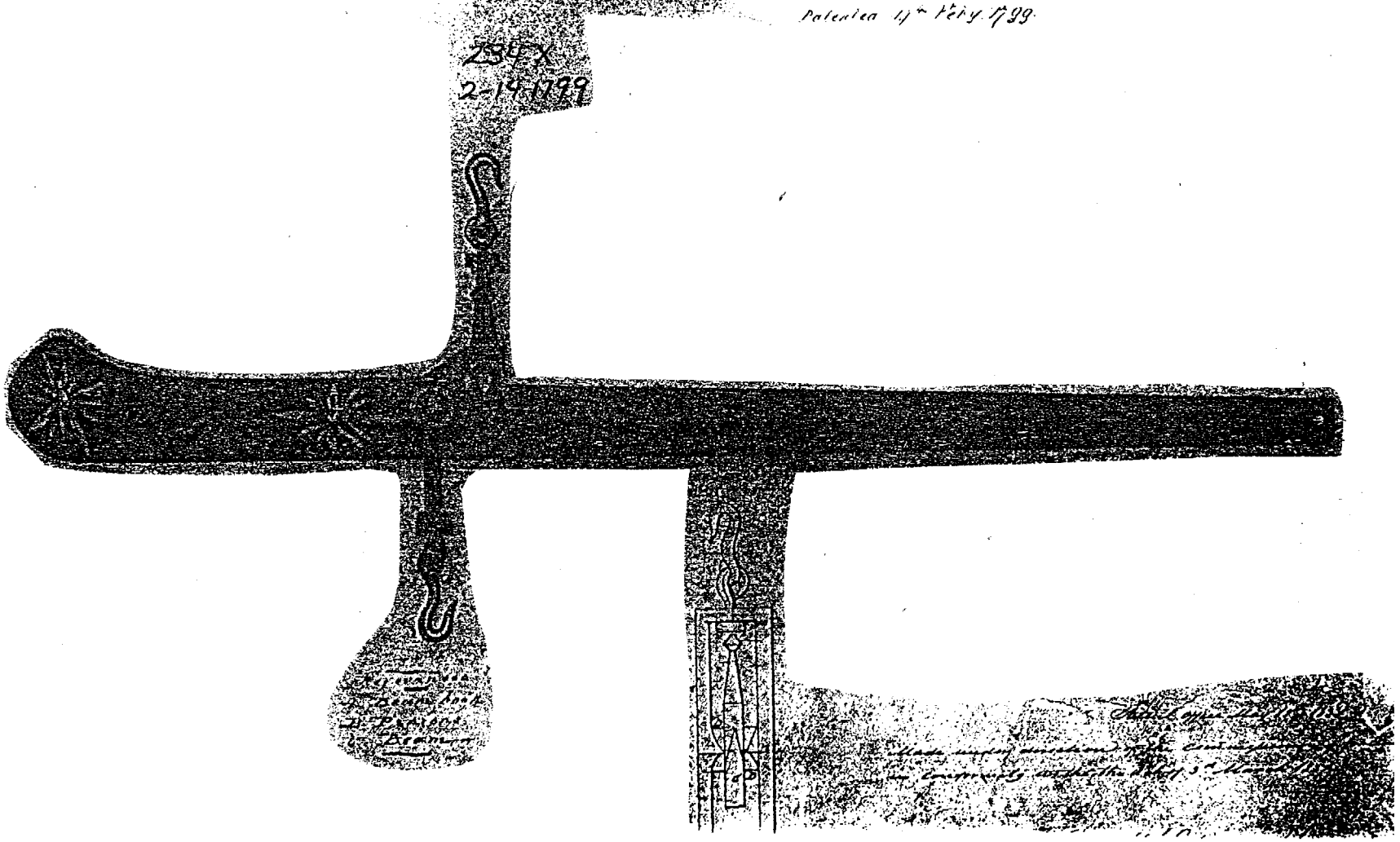

234X. 2-14-1799

Benjamin Dearborn of Massachusetts

Letters Patent Dated Feb. 4. 1799.

The Schedule referred to in these Letters Patent and making part of the
same containing a description in the words of the said Benjamin Dearborn
himself of an improvement being [illegible] vibrating Steel yard or just Balance.

The vibrating Steel yard or just Balance is made partly of iron & partly
of Steel of any dimensions required for weighing the smallest or largest
articles from Gold coins to Hogsheads of Sugar &c. The beam hooks
&c are of iron. the pivots or gudgeons and the circles in which they
turn are of Steel well tempered. The Beam is graduated on one
edge with notches on which two poises are hung or one only as oc-
casion may require. The poises (or Peas as they are usually termed)
may be made of lead, iron, Brass or any other ~~suitable~~ metal, or
even of stone. If made of lead they should be guarded by a brass
or other durable case to prevent a reduction of weight by wearing or
by those who use the instrument. All its parts should be preserved from
corrosion. This Steel yard when constructed of the most convenient
size for family use will weigh from one pound to two hundred and
fifty. and one of the poises must weigh two pounds and the other six
teen pounds. every notch on the beam producing a variation of two
ounces with the small poise and one pound with the large. in
Avoirdupoise weight. The poises might be made of other sizes
but these are the most convenient. The long arm of the Beam is
made sloping upward to nearly a sharp edge on which the notch-
es are cut. On the two sloping sides are figures denoting the weight
one side being marked for the small poise and the other for the
large which must be added together when both poises are on.
A Steel yard of this construction to weigh five hundred weight
needs only to have its parts made stronger and the large poise to weigh
thirty two instead of sixteen pounds. doubling all the numbers on
the large side of the beam. The notches with the thirty two pound
poise 234x 2-14-1799

[illegible] produce a variation of two pounds each and to obtain single pounds
or ounces the small poise must be added and the sum of their weights
taken as before. Other variations might be produced by the addition
of more [illegible] but the above is the simplest construction.
[illegible] this Steel yard a sufficient weight of iron is extended on one side of
the centre of motion to counterbalance the arm on which the poises are
to [illegible]. the centre of motion is placed above the centre of gravity &
in a line with the points of suspension. by these means the beam
vibrates like a scale Beam. during the process of weighing an arti-
cle and when the weight is off the friction being as much as possible
reduced by terminating the friction part of the gudgeons with sharp
edges and resting them in circles sufficiently large to prevent their block-
ing on either side on turning. A proof of the accuracy of this Balance
is obtained by an experiment which can be made on no other beam hith-
erto invented. It is as follows. In weighing any article sufficiently
heavy to balance both poises, (say 100 lbs.) the poises may be put on
any two numbers, which added together will produce 100; for exam-
ple one poise may be put at 9[illegible] and the other at 10. or one at 93 and
the other at 5. One at 80 and the other at 20. One at 78 and
the other at 22. and so on throughout the extent of the beam;
and if the workmanship be accurate the numbers will perfectly cor-
respond —

[illegible]

[illegible] (Drawing not to be made as [illegible] 750 words
and no Signature)

(Granted Feb. 14. 1799)